(12) United States Patent
Barrenscheen

(10) Patent No.: US 12,249,902 B2
(45) Date of Patent: Mar. 11, 2025

(54) POWER SEMICONDUCTOR MODULE, POWER ELECTRONIC ASSEMBLY INCLUDING ONE OR MORE POWER SEMICONDUCTOR MODULES, AND POWER CONVERSION CONTROL CIRCUIT FOR A POWER SEMICONDUCTOR MODULE

(71) Applicant: Infineon Technologies AG, Neubiberg (DE)

(72) Inventor: Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 488 days.

(21) Appl. No.: 17/527,584

(22) Filed: Nov. 16, 2021

(65) Prior Publication Data

US 2023/0155479 A1 May 18, 2023

(51) Int. Cl.
| | |
|---|---|
| *H02M 1/08* | (2006.01) |
| *H02J 50/00* | (2016.01) |
| *H02J 50/10* | (2016.01) |
| *H02J 50/80* | (2016.01) |
| *H02M 1/00* | (2006.01) |

(52) U.S. Cl.
CPC ............ *H02M 1/08* (2013.01); *H02J 50/005* (2020.01); *H02J 50/10* (2016.02); *H02J 50/80* (2016.02); *H02M 1/0003* (2021.05)

(58) Field of Classification Search
CPC .......... H02J 50/005; H02J 50/10; H02J 50/80; H02J 50/12; H02J 7/02; H02M 1/0003; H02M 1/00; H02M 1/088; H02M 1/08
See application file for complete search history.

(56) References Cited

U.S. PATENT DOCUMENTS

| | | | |
|---|---|---|---|
| 7,050,763 B2 | 5/2006 | Stengel et al. | |
| 9,219,028 B1* | 12/2015 | Higgins, III | .......... H01L 23/645 |
| 2013/0055052 A1* | 2/2013 | Kaeriyama | ............. H02M 1/08 |
| | | | 714/799 |

(Continued)

OTHER PUBLICATIONS

"CIPOS™ Maxi IPM", AN2019-16; IM818 Series application note; www.infineon.com, Jun. 7, 2019, pp. 1-50.

(Continued)

*Primary Examiner* — Kyle J Moody
*Assistant Examiner* — Jye-June Lee
(74) *Attorney, Agent, or Firm* — Murphy, Bilak & Homiller, PLLC

(57) ABSTRACT

A module includes: an electrically insulative housing; a driver circuit enclosed in the housing and configured to drive a control terminal of a power switch; a wireless communication circuit enclosed in the housing and configured to receive, through the housing, wireless control information transmitted to the module; and a wireless energy receiver enclosed in the housing and configured to receive, through the housing, energy wirelessly transmitted to the module, and to supply power to the driver circuit. The driver circuit is configured to drive the control terminal of the power switch based on the wireless control information received by the wireless communication circuit. A power electronic assembly that incorporates one or more of the modules and a corresponding power conversion control circuit are also described.

23 Claims, 12 Drawing Sheets

(56) References Cited

U.S. PATENT DOCUMENTS

| | | | | |
|---|---|---|---|---|
| 2015/0137871 A1* | 5/2015 | Takano | ................... | H02M 1/08 |
| | | | | 327/389 |
| 2015/0234417 A1* | 8/2015 | Kawai | ..................... | H02M 1/08 |
| | | | | 323/299 |
| 2021/0376822 A1* | 12/2021 | Thompson | .......... | H01F 27/2804 |
| 2023/0101061 A1* | 3/2023 | Fabbro | ................ | H03K 17/689 |
| | | | | 361/115 |
| 2023/0155470 A1* | 5/2023 | Fukura | ................ | H01F 27/2804 |
| | | | | 323/282 |

OTHER PUBLICATIONS

"HybridPACK™ Drive", AN-HPD-ASSEMBLY; Assembly Instructions for the HybridPACK™ Drive; www.infineon.com, Sep. 12, 2019, pp. 1-52.

"Wireless TX", Texas Instruments; www.ti.com, Aug. 20, 2014, pp. 1-3.

* cited by examiner

POWER SEMICONDUCTOR MODULE, POWER ELECTRONIC ASSEMBLY INCLUDING ONE OR MORE POWER SEMICONDUCTOR MODULES, AND POWER CONVERSION CONTROL CIRCUIT FOR A POWER SEMICONDUCTOR MODULE

BACKGROUND

Power semiconductor modules include one or more power semiconductor devices such as power MOSFETs (metal-oxide-semiconductor field-effect transistors), HEMTs (high-electron mobility transistors), IGBTs (insulated gate bipolar transistors), power diodes, etc., related gate driver circuitry and possibly even a controller, for implementing a power electronic assembly such as a DC/AC inverter, a DC/DC converter, an AC/DC converter, a DC/AC converter, an AC/AC converter, or the like. Such power electronic assemblies are widely used in various applications, from power supply systems to motor control, to name a few. In some cases, status, control and switching information for gate driver applications may be transferred over an isolation barrier, e.g., in the case of a flyback or forward converter, where the isolation barrier ensures creepage and clearance requirements are satisfied. However, a fully wireless approach for power applications requires much more just a wireless connection for data transfer between primary and secondary parts of a gate driver. For example, power supply for control and measurement units needed to operate a power switch and would also have to be transferred wirelessly. Such a complete wireless solution for power semiconductor modules is lacking.

Thus, there is a need for a power semiconductor module having wireless transfer of status, control and switching information and wireless transfer of power.

SUMMARY

According to an embodiment of a module, the module comprises: an electrically insulative housing; a driver circuit enclosed in the housing and configured to drive a control terminal of a power switch; a wireless communication circuit enclosed in the housing and configured to receive, through the housing, wireless control information transmitted to the module; and a wireless energy receiver enclosed in the housing and configured to receive, through the housing, energy wirelessly transmitted to the module, and to supply power to the driver circuit, wherein the driver circuit is configured to drive the control terminal of the power switch based on the wireless control information received by the wireless communication circuit.

According to an embodiment of a power electronic assembly, the power electronic assembly comprises: a power switch; a primary-side control unit configured to control operation of the power switch; and a secondary-side module wirelessly coupled to the primary-side control unit and comprising: an electrically insulative housing; a driver circuit enclosed in the housing and configured to drive a control terminal of the power switch; a wireless communication circuit enclosed in the housing and configured to receive, through the housing, wireless control information transmitted from the primary-side control unit to the secondary-side module and associated with operation of the power switch; and a wireless energy receiver enclosed in the housing and configured to receive, through the housing, energy wirelessly transmitted from the primary-side control unit to the secondary-side module, and to supply power to the power switch and the driver circuit, wherein the driver circuit of the secondary-side module is configured to drive the control terminal of the power switch based on the wireless control information received by the wireless communication circuit.

According to an embodiment of a power conversion control circuit, the power conversion control circuit comprises: a wireless communication circuit configured to wirelessly transmit control information to an insulated module that includes a driver circuit for a power switch, wherein the control information is configured to control operation of the power switch via the driver circuit; and a wireless energy transmitter configured to wirelessly transmit energy to the insulated module, for supplying power to the driver circuit.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a power semiconductor module having wireless transfer of status, control and switching information and wireless transfer of power, a power electronic assembly that incorporates one or more of the modules and a corresponding power conversion control circuit. The electrically insulative housing of the module may have a first dedicated area through which wireless control information is transferred to a wireless communication circuit included in the module, and a second dedicated area through which wireless energy is transferred to a wireless energy receiver included in the module. The complete wireless transfer of energy and information offers the possibility to remove electrically conducting connections between the primary and secondary parts of the system. This also implies that the isolation barrier may be built via packaging of the power switch(es) with no requirement that the isolation barrier between the primary and secondary sides be split up into several parts and components. If the load terminals of the power switch(es) are the only electrically conducting connections of the module, the overall mounting effort of the corresponding power electronic assembly is significantly reduced.

Described next, with reference to the figures, are exemplary embodiments of the power semiconductor module, power electronic assembly produced from one or more of the power semiconductor modules and a corresponding power conversion control circuit.

Figure 1:
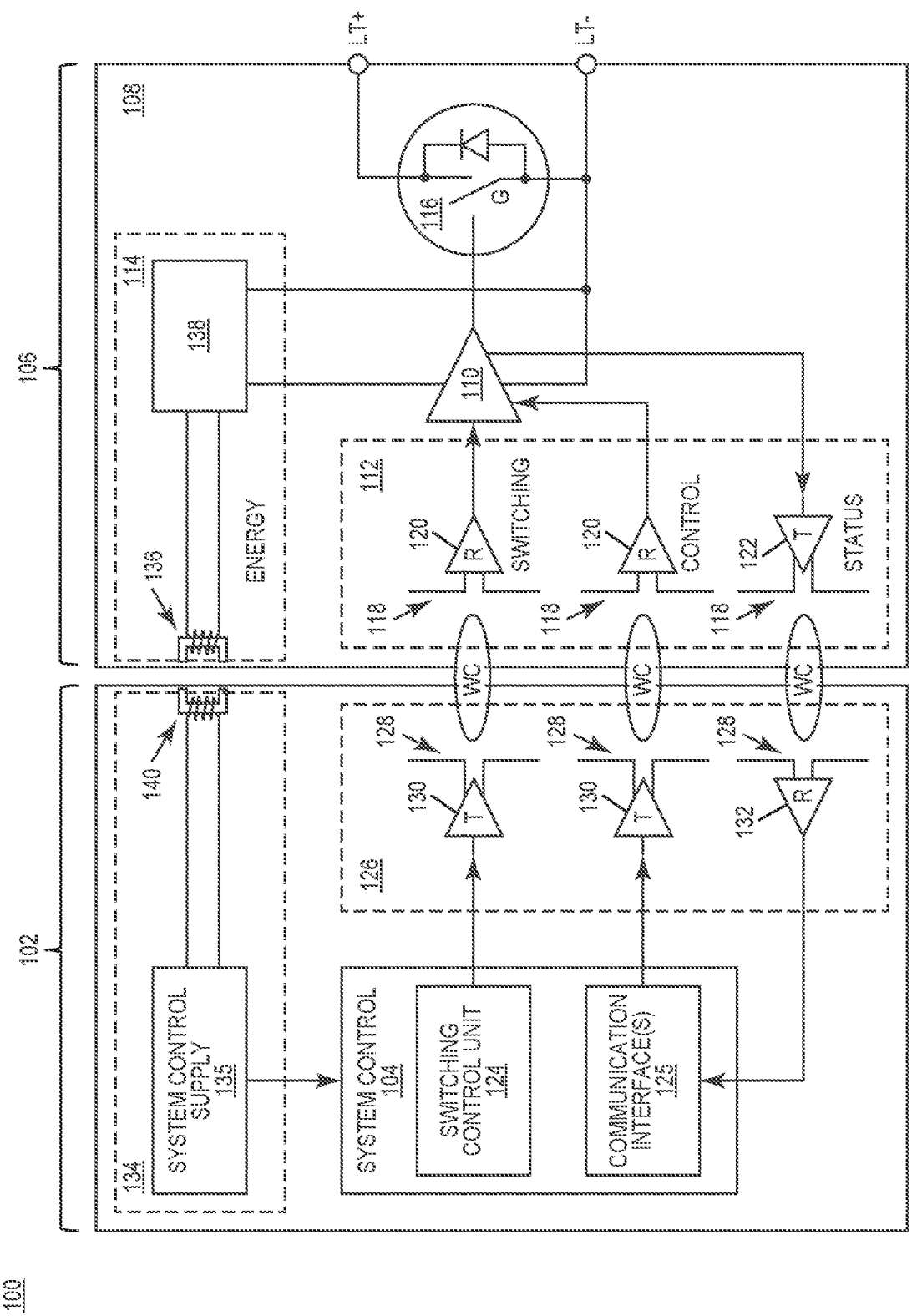
FIG. 1 illustrates a block diagram of an embodiment of a power electronic assembly having a primary side with corresponding control circuitry and a secondary side with a wireless power semiconductor module.

FIG. 1 illustrates a block diagram of a power electronic assembly 100 having a primary side 102 with corresponding control circuitry 104 and a secondary side 106 with a power semiconductor module 108. The power electronic assembly 100 may be designed for use, e.g., as a DC/AC inverter, a DC/DC converter, an AC/DC converter, a DC/AC converter, an AC/AC converter, or the like.

Complete electrical (galvanic) isolation is provided between the primary and secondary sides 102, 106 of the power electronic assembly 100. The isolation between the primary and secondary sides 102, 106 of the power electronic assembly 100 ensures creepage and clearance distance requirements are satisfied, which is of particular importance for high voltage applications in the range of hundreds or even thousands of volts. The isolation between the primary and secondary sides 102, 106 of the power electronic assembly 100 may be implemented entirely at the secondary side 106, entirely at the primary side 102, or partly at the secondary side 106 and partly at the primary side 102, as described in more detail later herein.

In each case, status, control and switching information as well as power are implemented wirelessly between the primary and secondary sides 102, 106 of the power electronic assembly 100. Accordingly, load terminals 'LT+', 'LT−' of the power semiconductor module 108 may be the only electrically conducting (galvanic) connections to the module 108.

The power semiconductor module 108 includes an electrically insulative housing (not shown in the block diagram of FIG. 1) and a driver circuit 110, a wireless communication circuit 112 and a wireless energy receiver 114 each enclosed in the housing. The driver circuit 110 is configured to drive a control terminal 'G' of a power switch 116 based on wireless control information ('control') received by the wireless communication circuit 112. The components 104, 134 on the primary side 102 of the power electronic assembly 100 for a primary-side control unit that controls operation of the power switch 116 on the secondary side 106.

For example, control information wirelessly received from the primary-side control unit may include a PWM (pulse width modulation) signal. The wireless communication circuit 112 on the secondary side 106 receives the wirelessly transmitted PWM information and the driver circuit 110 enhances the voltage and/or current of the PWM control signal to a level sufficient for driving the control terminal G of the power switch 116. The power switch 116 may be, e.g., a power MOSFET, a HEMT, an IGBT, etc. The power switch 116 may be enclosed in the housing of the power semiconductor module 108, attached to a surface of the module housing, or provided in another module, package, circuit board, etc. separate from the module 108.

In each case, the wireless communication circuit 112 is configured to receive, through the module housing, the wireless control information transmitted to the power semiconductor module 108 from the primary side 102 and for controlling the driver circuit 110. The wireless communication circuit 112 is also configured to receive, through the module housing, wireless switching information ('switching') transmitted to the module 108 and for determining the state of the signal output by the driver circuit 110 and applied to the control terminal G of the power switch 116. The wireless communication circuit 112 also may be configured to transmit, through the housing, status information ('status') associated with operation of the power switch 116. For example, the status information may include telemetry data such as voltage, current and/or temperature information, fault information, etc.

In one embodiment, the wireless communication circuit 112 includes a mm (millimeter) wave antenna 118 for receiving and transmitting information as mm wave signals, and related receive ('R') and transmit ('T') circuitry 120, 122. For example, the mm wave antenna 118 may be used for frequencies in the range of tens of GHz, where the antenna dimensions are in the range of a few mm and corresponding antenna structures with these dimensions can be built on a PCB. In another example, wireless transfer of control or status information may be implemented using known techniques for capacitive or inductive coupling between the two sides of the electrically insulated housing, e.g., with or without a magnetic core. In another example, optical transfer also may be implemented, e.g., if the insulating housing contains areas that are transparent for the respective wavelength of the optical transmitters. In another example, electrically insulating but magnetically coupling material (e.g., moulded ferrite cores) may be incorporated in the housing.

The control circuitry 104 on the primary side 102 of the power electronic assembly 100 includes a switching control unit 124 such as a PWM generator for generating the secondary-side switching information and a wireless communication circuit 126 for wirelessly transmitting the secondary-side switching information to the power semiconductor module 108 on the secondary side 106 of the power electronic assembly 100. The control circuitry 104 on the primary side 102 of the power electronic assembly 100 also includes one or more communication interfaces 125 for generating the secondary-side control information and for processing the status information received from the secondary side 106.

A wireless communication circuit 126 on the primary side 102 of the power electronic assembly 100 transmits the wireless control information ('control') and the wireless switching information ('switching') to the power semiconductor module 108 on the secondary side 106 and receives the wireless status information ('status') from the module 108. In one embodiment, the primary-side wireless communication circuit 126 includes a mm (millimeter) wave antenna 128 for receiving and transmitting information as mm wave signals, and related transmit ('T') and receive ('R') circuitry 130, 132. The wireless communication channels of the control, switching and status information between the primary and secondary sides 102, 106 of the power electronic assembly 100 are each labelled 'WC' in FIG. 1. In one example, each wireless communication channel may be built as an independent unit, whereas in other examples, two or more communication channels may be combined into a wireless communication unit, e.g., by representing each communication channel by a different modulation scheme. In the following, the wording 'wireless communication channel' refers to the data flow between a primary side unit and a secondary side unit, regardless of whether implemented as independent units or by sharing a common resource. The wireless communication channel WC, as used in the following figures, also represents a physical dimension or area needed for the wireless transfer of information, e.g., the coupled areas for coupling capacitors or coils of both sides of an insulated housing, or the 'beam' of a mm-wave transmitter, or the light of an optical transfer mechanism.

Energy is also wirelessly transmitted from the primary side 102 to the secondary side 106 of the power electronic assembly 100. The primary side 102 includes the wireless communication circuit 126 and a wireless energy transmitter 134 that wirelessly transmits energy to the secondary-side power module 108, for supplying power to the secondary-side driver circuit 110. The wireless energy transmitter 134 includes a system control supply 135 for supplying power to the primary-side control circuitry 104. Energy is also wirelessly transmitted from the system control supply 135 on the primary side 102 to the power semiconductor module 108 on the secondary side 106. The wireless energy receiver 114 on the secondary side 106 receives, through the module housing, the energy ('energy') wirelessly transmitted from the primary side 102 and supplies power to the driver circuit 110 included in the power semiconductor module 108. In one embodiment, the wireless energy receiver 114 includes a coil 136 configured to receive, through the module housing, the energy wirelessly transmitted from the primary side 102 to the module 108, a capacitor (not shown) for buffering the energy received by the coil 136, and an energy conditioning circuit 138 such as a power supply configured to supply power to the driver circuit 110 from the energy received by the coil 136. The coil 136 may be formed as a molded structure soldered to a printed circuit board (PCB). The coil 136 instead may be formed from a foil that is attached to a carrier. The primary side 102 wireless energy transmitter 134 similarly includes a coil 140 for wirelessly transmitting energy from the primary-side wireless energy transmitter 134 to the power semiconductor module 108 on the secondary side 106.

For example, sets of coils and capacitors may be used to form a resonant circuit for wireless charging of the secondary-side 106. Depending on the number of turns and amount of energy to be wirelessly transferred, the transmitting and receiving coils 140, 136 may be constructed in different ways. For example, the transmitting and receiving coils 140, 136 may be produced as molded structures that can be soldered to a PCB, built in a flexible way by using a kind of foil that can be glued to a carrier (e.g., to a part of a package and then connected by soldered wires, or included in a PCB.) A transformer with a magnetic core may be split into independent parts, with independent coils. One part of the transformer with one coil (or one set of coils) is located inside the power module 108, another part with another coil (or set of coils) outside the module 108. Another example is to isolate one coil (or set of coils) from the magnetic core and the other coil (or set of coils), e.g., one coil (or set of coils) may be located in a package or module with a hole to pass a part of the magnetic core and another part of the magnetic core with the remaining coil(s) may be mounted closely to the magnetic circuit. Depending on the type of transformer, topologies like flyback, forward, Zeta, SEPIC, CUK, or phase-shifted half-bridge may be used (also other topologies may be used).

For these examples, the air gap between the coils or magnetic core parts should be large enough to stand the isolation voltage but not too big to ensure a coupling of the magnetic fields. The wireless energy transmitter 134 located on the primary side 102 generates the AC voltage that is transferred to the secondary side 106, where it is rectified and adapted by the secondary-side the wireless energy receiver 114 to the needs of the secondary-side components 110, 112. Good efficiency for the transferred power is preferred. The wireless energy transmitter 134 may be located outside the primary-side package or module. Accordingly, a lower efficiency may result for the wireless energy transfer which leads to a higher energy consumption on the primary side 102. Cooling of the wireless energy transmitter 134 outside the primary-side package or module is simpler than for components inside the package or module. Accordingly, a slightly decreased efficiency on primary side 102 is acceptable.

The embodiment shown in FIG. 1 enables the complete wireless transfer of energy and information between the primary and secondary sides 102, 106 of the power electronic assembly 100, offering the possibility to remove electrically conducting (galvanic) connections between the primary and secondary sides 102, 106 of the system 100. For example, this means that the only electrical (galvanic) connections to the power semiconductor module 108 are the load terminals LT+, LT−. Such a configuration significantly simplifies the overall mounting effort needed to secure the primary and secondary sides 102, 106 of the system 100, by eliminating the pin connections conventionally used for energy and information transfer.

Figure 2:
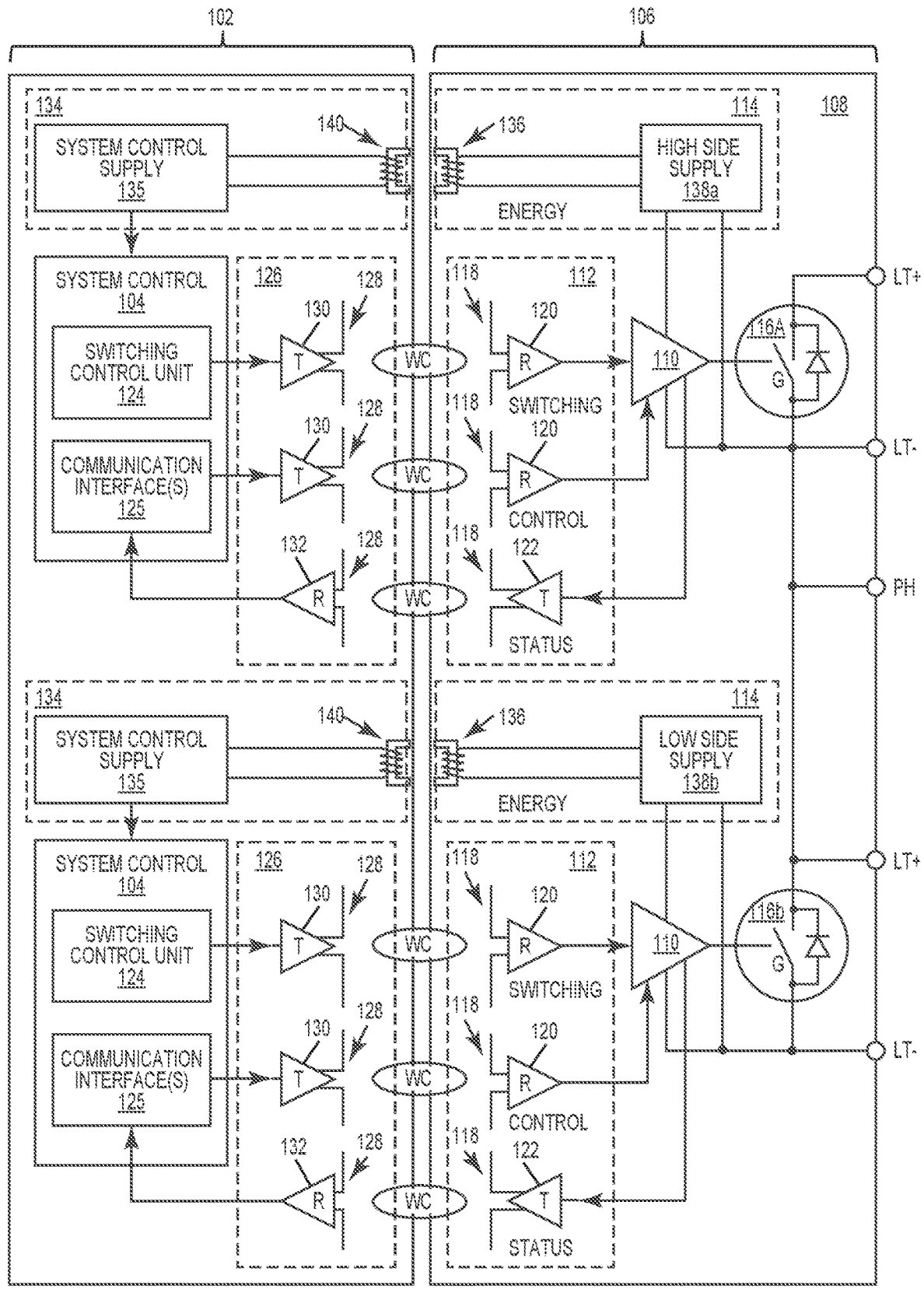
FIG. 2 illustrates a block diagram of another embodiment of a power electronic assembly having a primary side with corresponding control circuitry and a secondary side with a wireless power semiconductor module.

FIG. 2 illustrates a block diagram of another embodiment of a power electronic assembly 200 with complete wireless transfer of energy and information between the primary and secondary sides 102, 106 of the power electronic assembly 100. The embodiment illustrated in FIG. 2 is similar to the embodiment illustrated in FIG. 1. Different, however, the power semiconductor module 108 of the power electronic assembly 200 in FIG. 2 includes a first power switch 116a and a second power switch 116b.

The first and second power switches 116a, 116b are electrically coupled in a half bridge configuration with the first power switch 116a being the high-side switch and the second power switch 116b being the low-side switch. Each power switch 116a, 116b may be, e.g., a power MOSFET, a HEMT, an IGBT, etc. Each power switch 116a, 116b may be enclosed in the housing of the power semiconductor module 108, attached to a surface of the module housing, or provided in another module, package, circuit board, etc. separate from the module 108.

The switching node between the first and second power switches 116a, 116b forms a phase node 'PH' of the power semiconductor module. In the case of a multi-phase system, more than one half bridge is provided with each half bridge forming one phase of the multi-phase system.

The control circuitry 104 on the primary side 102 and the wireless communication circuit 112 on the secondary side 106 are designed to accommodate half bridge operation, which is logically illustrated in FIG. 2 as a replication of the respective functionalities. The wireless energy transmitter 134 on the primary side 102 and the wireless energy receiver 114 on the secondary side 106 are also designed to accommodate half bridge operation, which is logically illustrated in FIG. 2 as a replication of the respective functionalities. For example, the wireless energy receiver 114 on the secondary side 106 includes a high-side power supply 138a for the high-side driver circuit 110 and a low-side power supply 138b for the low-side driver circuit 110. The same set of coils 136, 140 may be used to wirelessly transfer energy from the primary side 102 to the secondary side 106 of the power electronic assembly 200, for powering both power switches 116a, 116b of the power semiconductor module 108. Alternatively, a first set of coils 136, 140 may be used to wirelessly transfer energy from the primary side 102 to the secondary side 106 of the power electronic assembly 200 for powering the high-side power switch 116*a* and a second set of coils 136, 140 may be used to wirelessly transfer energy from the primary side 102 to the secondary side 106 for powering the low-side power switch 116*b*. Again, the duplication shown in FIG. 2 indicates the functionality for accommodating half bridge operation and does not necessarily mean that duplicate physical circuit components are required.

Described next are various embodiments for physically implementing the power semiconductor module 108 shown in FIGS. 1 and 2.

Figure 3:
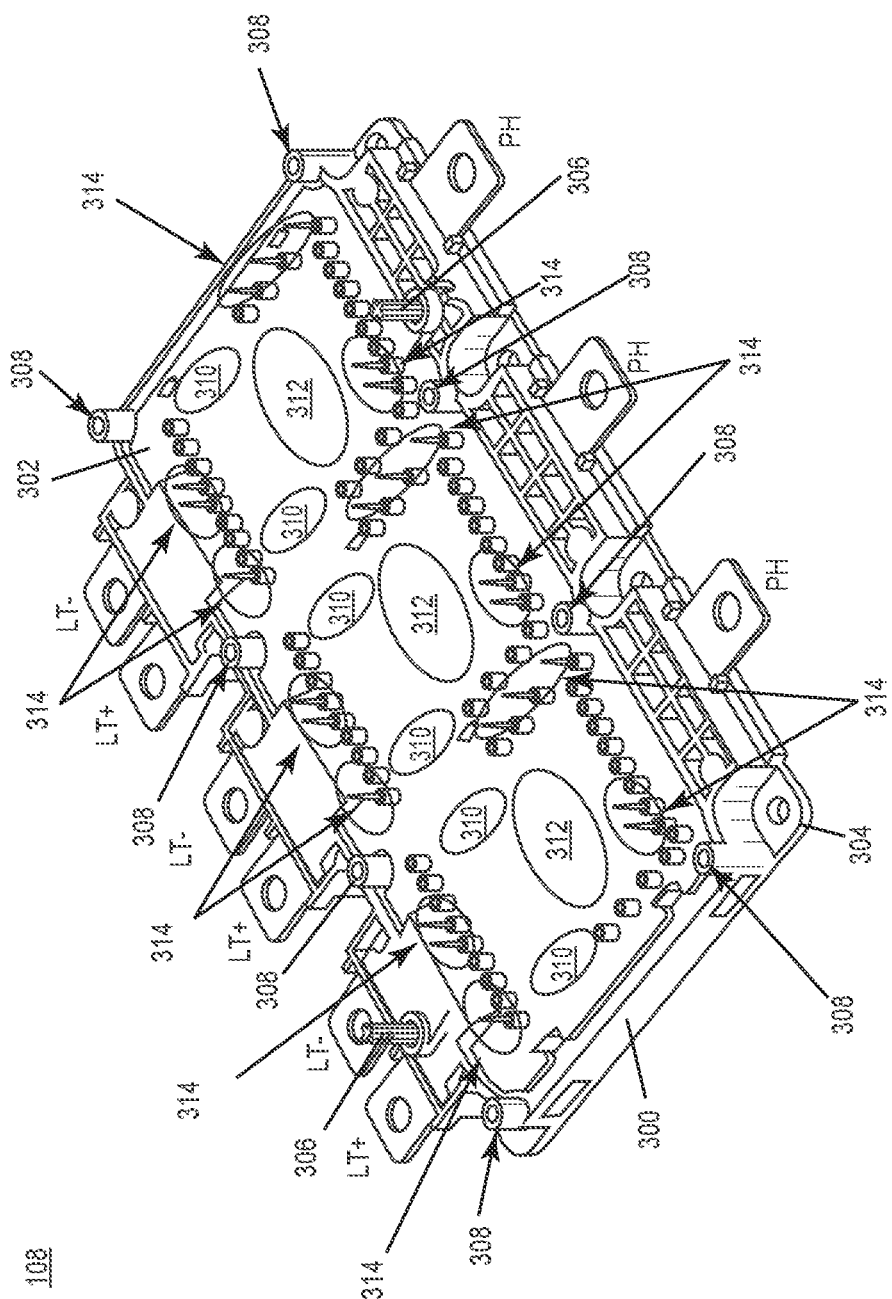
FIG. 3 illustrates a top perspective view of the wireless power semiconductor module, according to an embodiment.

FIG. 3 illustrates a top perspective view of the power semiconductor module 108. According to this embodiment, the electrically insulative housing of the module 108 includes an electrically insulative base 300 and an electrically insulative lid 302. The secondary-side driver circuit 110, wireless communication circuit 112, wireless energy receiver 114 and each power switch 116 are seated in an open space defined by the base 300 and lid 302 but are not visible in FIG. 3. For example, the wireless communication circuit 112, wireless energy receiver 114 may be attached to an interior surface of the lid 302 or to a substrate (not visible in FIG. 3) attached to the interior surface of the lid 302. A metal plate 304 may be attached to the exterior surface of the substrate.

The power semiconductor module 108 may include alignment posts 306 for aligning the module 108 to a primary-side circuit board (not shown in FIG. 3). Openings 308 may be formed in the housing for receiving fasteners such as screws that fasten the module 108 to the primary-side circuit board.

The power semiconductor module 108 is shown as a 3-phase module in FIG. 3. However, the module may have more or less than 3 phases PH.

Regardless of the number of phases PH, the electrically insulative lid 302 of the power semiconductor module 108 has a first dedicated area 310 through which the wireless control and switching information is transferred from the primary side 102 to the wireless communication circuit 112 included in the secondary-side module 108. The lid 302 also includes a second dedicated area 312 through which the wireless energy is transferred from the primary side 102 to the wireless energy receiver 114 included in the secondary-side module 108. 'Dedicated' in this context means that the first dedicated area 310 of the lid 302 is devoid of structures that would otherwise interfere with the wireless transfer of control and switching information to the power semiconductor module 108, and that the second dedicated area 312 of the lid 302 is similarly devoid of structures that would otherwise interfere with the wireless transfer of energy to the module 108. Accordingly, pins 314 conventionally used for energy and information transfer may be omitted from the power semiconductor module 108, which significantly simplifies mounting to the module 108. The first dedicated area 310 and the second dedicated area 312 of the module housing may or may not partly overlap with one another.

Figure 4A:
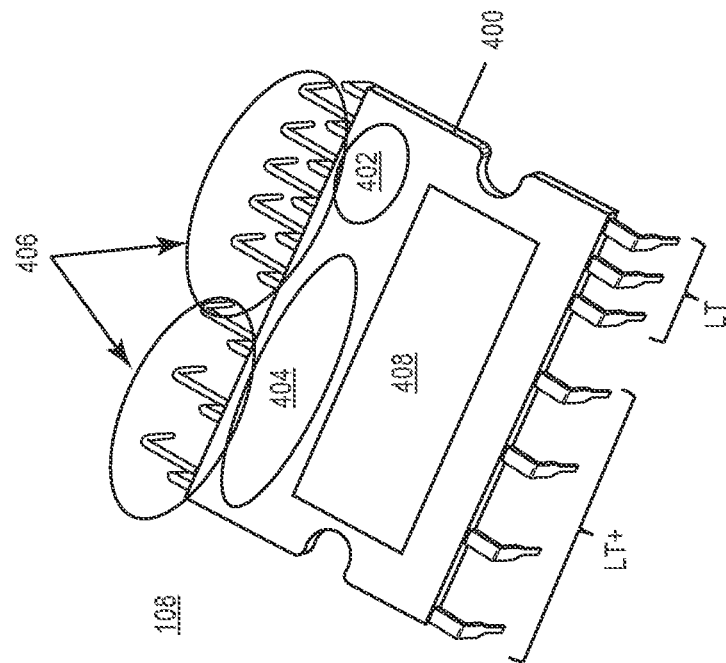
FIG. 4A illustrates a bottom perspective view and FIG. 4B illustrates a top perspective view of the wireless power semiconductor module, according to another embodiment.
Figure 4B:
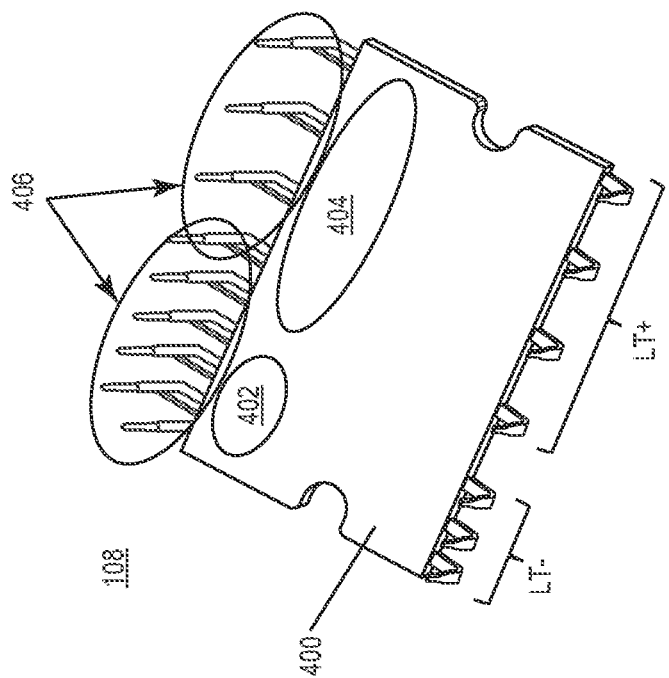

FIGS. 4A and 4B illustrate the power semiconductor module 108, according to another embodiment. FIG. 4A shows a bottom perspective view of the module 108 and FIG. 4B shows a top perspective view.

According to the embodiment illustrated in FIGS. 4A and 4B, the electrically insulative housing of the power semiconductor module 108 comprises a mold compound 400. The wireless communication circuit 112, wireless energy receiver 114 and each power switch 116 are embedded in the mold compound 400. The driver circuit 110 also may be embedded in the mold compound 400.

Similar to the lid 302 shown in FIG. 3, the mold compound 400 includes a first dedicated area 402 through which the wireless control information is transferred from the primary side 102 to the wireless communication circuit 112 of the secondary-side power semiconductor module 108, and a second dedicated area 404 through which the wireless energy is transferred from the primary side 102 to the wireless energy receiver 114 of the secondary-side module 108. Accordingly, pins 406 conventionally used for energy and information transfer may be omitted from the power semiconductor module 108, which significantly simplifies mounting to the module 108. A heat sink 408 may be provided at the top side of the mold compound 400. The position of the first and second dedicated areas 402, 404 is chosen such that the heat sink 408 does not interfere with the wireless transfer of control and switching information and energy to the power semiconductor module 108.

Figure 5B:
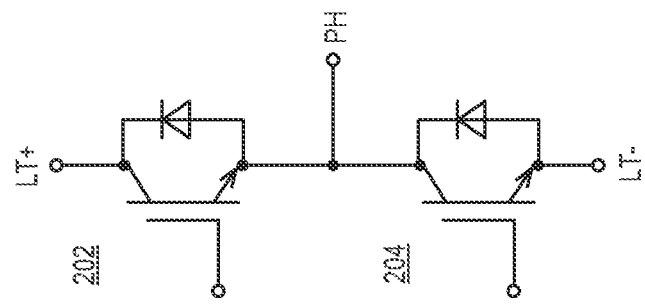
FIG. 5A illustrates a top perspective view of the wireless power semiconductor module and FIG. 5B illustrates a schematic of a half bridge implemented by the module, according to another embodiment.
Figure 5A:
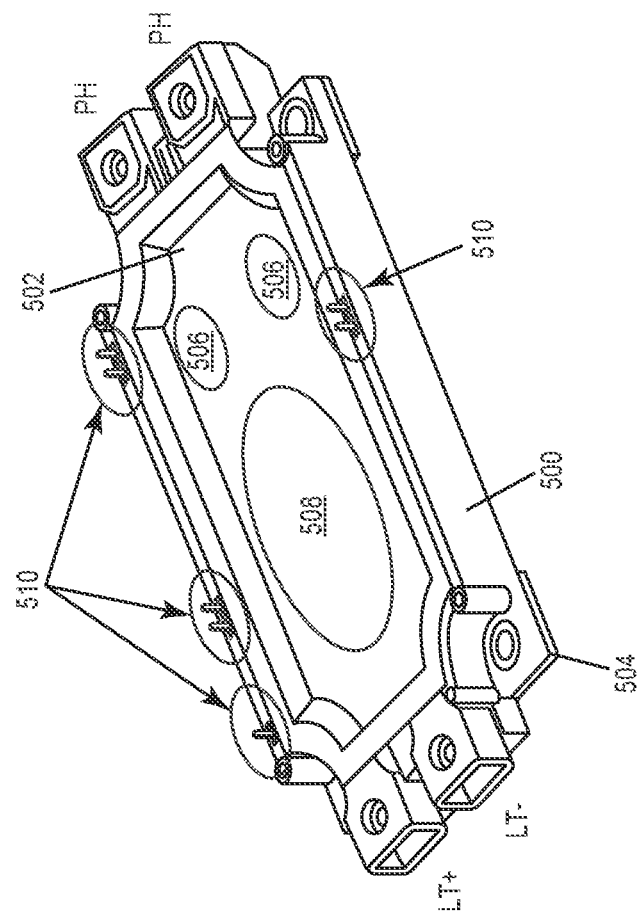

FIGS. 5A and 5B illustrate the power semiconductor module 108, according to another embodiment. FIG. 5A shows a top perspective view of the module 108 and FIG. 5B shows a schematic of a half bridge implemented by the module 108.

According to the embodiment illustrated in FIGS. 5A and 5B, the electrically insulative housing of the module 108 includes an electrically insulative base 500 and an electrically insulative lid 502. The secondary-side driver circuit 110, wireless communication circuit 112, wireless energy receiver 114 and each power switch 116 are seated in an open space defined by the base 500 and lid 502 but are not visible in FIG. 5A. For example, the wireless communication circuit 112, wireless energy receiver 114 may be attached to an interior surface of the lid 502 or to a substrate (not visible in FIG. 5A) attached to the interior surface of the lid 502. A metal plate 504 may be attached to the exterior surface of the substrate.

The electrically insulative lid 502 of the power semiconductor module 108 has a first dedicated area 506 through which the wireless control and switching information is transferred from the primary side 102 to the wireless communication circuit 112 included in the secondary-side module 108. The lid 502 also includes a second dedicated area 508 through which the wireless energy is transferred from the primary side 102 to the wireless energy receiver 114 included in the secondary-side module 108. Accordingly, pins 510 conventionally used for energy and information transfer may be omitted from the power semiconductor module 108, which significantly simplifies mounting to the module 108.

Described next are various embodiments for physically implementing a power electronic assembly that includes one or more of the power semiconductor modules 108.

Figure 6:
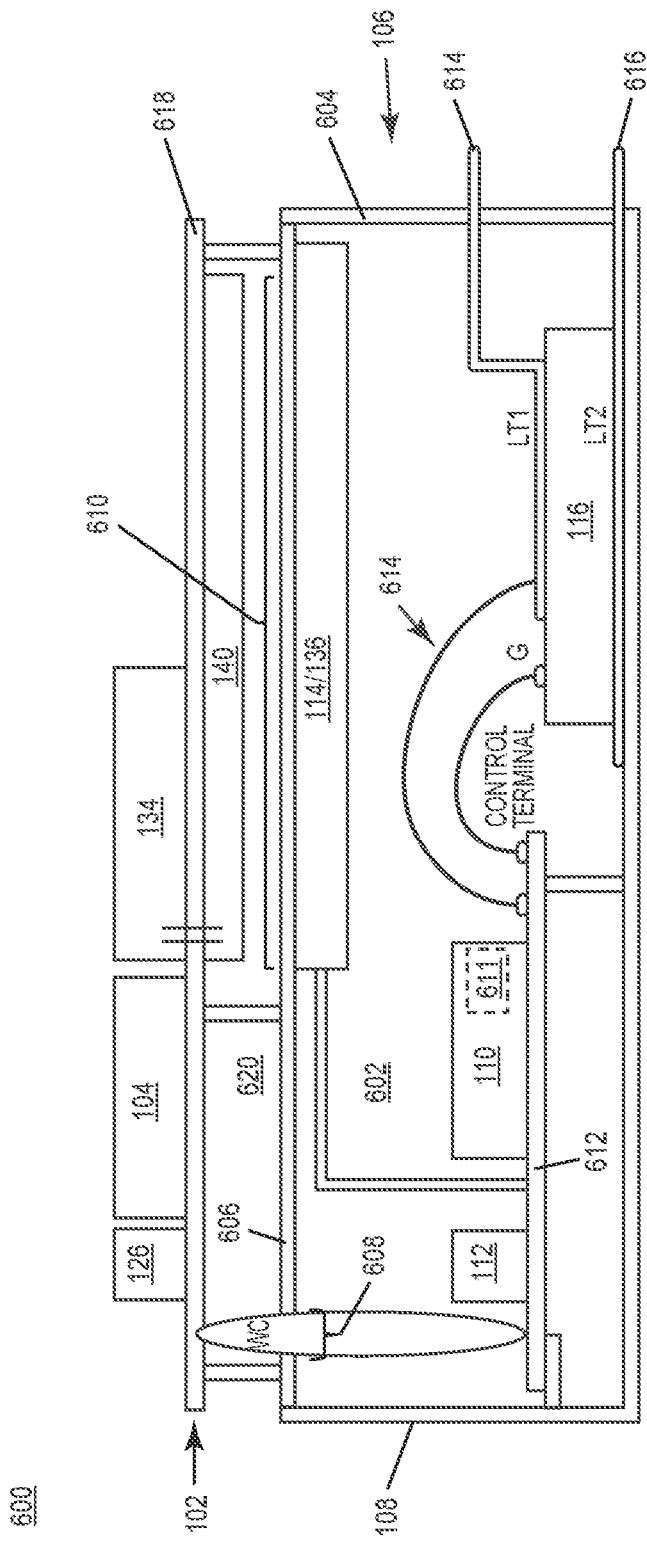
FIGS. 6 through 12 illustrate respective sectional diagrams of different embodiments of a power electronic assembly having a primary side with corresponding control circuitry and a secondary side with a wireless power semiconductor module.

FIG. 6 illustrates a sectional view of a power electronic assembly 600 that includes the power semiconductor module 108. According to this embodiment, the electrically insulative housing of the power semiconductor module 108 delimits an interior space 602 of the module 108 and includes electrically insulative sidewalls 604 and an electrically insulative cover 606. The secondary-side driver circuit 110, wireless communication circuit 112 and wireless energy receiver 114 are each disposed in the interior space 602 of the housing. The housing also includes a first dedicated area 608 through which the wireless control and switching information is transferred from the primary side 102 to the secondary-side wireless communication circuit 112. The housing further includes a second dedicated area 610 through which the wireless energy is transferred from the primary side 102 to the secondary-side wireless energy receiver 114. A magnetic core may be used for wireless energy coupling of energy. For example, a first half of the core may be located on the primary side 102 of the power electronic assembly 600 and a second half of the core may be located on the secondary side 106. A core-less approach instead may be used for wireless energy coupling, but the dedicated area 610 for wireless energy coupling may be larger.

The power switch 116 also is included in the module and disposed in the interior space 602, according to this embodiment. The driver circuit 110 is electrically connected to the control terminal G and to a first load terminal LT1 of the power switch 116 within the housing. For example, the first load terminal LT1 of the power switch 116 may be a source terminal and the driver circuit 110 may sense the source current. A sensor 611 enclosed in the module senses the source current, the temperature or another parameter of the power switch 116 and the wireless communication circuit 112 converts the electrical signal generated by the sensor 611 to a wireless signal and transmits the wireless signal to the primary side 102 of the power electronic assembly 600 through the corresponding dedicated area 608 of the module housing, e.g., via the transmit circuitry 122 shown in FIGS. 1 and 2. The sensor 611 may be included in or associated with the driver circuit 110, or may be a separate component included in the module housing.

The wireless communication circuit 112 and the power switch 116 may be attached to a substrate 612 enclosed in the housing and separate from the power switch 116. The substrate 612 may be a PCB, DCB (direct copper bonded) substrate, AMB (active metal brazed) substrate, IMS (insulated metal substrate), etc. The power switch 116 and the driver circuit 110 are electrically connected to one another by electrical conductors 614 such as bond wires enclosed in the housing.

In FIG. 6, the power semiconductor module 108 also includes a first pin 614 electrically connected to the first load terminal LT1 of the power switch 116 and protruding through one of the electrically insulative sidewalls 604 or the electrically insulative cover 606 of the module housing. A second pin 616 of the module 108 is electrically connected to the second load terminal LT2 of the power switch 116 and protrudes through one of the electrically insulative sidewalls 604 or the electrically insulative cover 606 of the module housing.

On the primary side 102, the primary-side components 104, 126, 134, 140 may be attached to a substrate 618 such as a PCB, DCB substrate, AMB substrate, IMS substrate, etc. The primary-side substrate 618 is attached to the outside of the secondary-side power semiconductor module 108 where 'outside' also means that the creepage and clearance distance needed for the insulation characteristics are respected. The primary-side coil 140 for wirelessly transmitting energy to the secondary side 106 may be attached to the side of the primary-side substrate 618 that faces the secondary-side power module 108. The secondary-side coil 136 for receiving the wirelessly transmitted energy may be attached to the electrically insulative cover 606 of the module housing and aligned with the primary-side coil 140 to enable the wireless energy transfer. Pins conventionally used for energy and information transfer between the primary and secondary sides 102, 106 of the power electronic assembly 600 may be omitted from the power semiconductor module 108, which significantly simplifies mounting of the primary-side substrate 618 to the secondary-side power module 108. Also, an additional insulating material and/or an air gap 620 may be provided between the secondary-side power module 108 and the primary-side control unit 104, 134.

Figure 7:
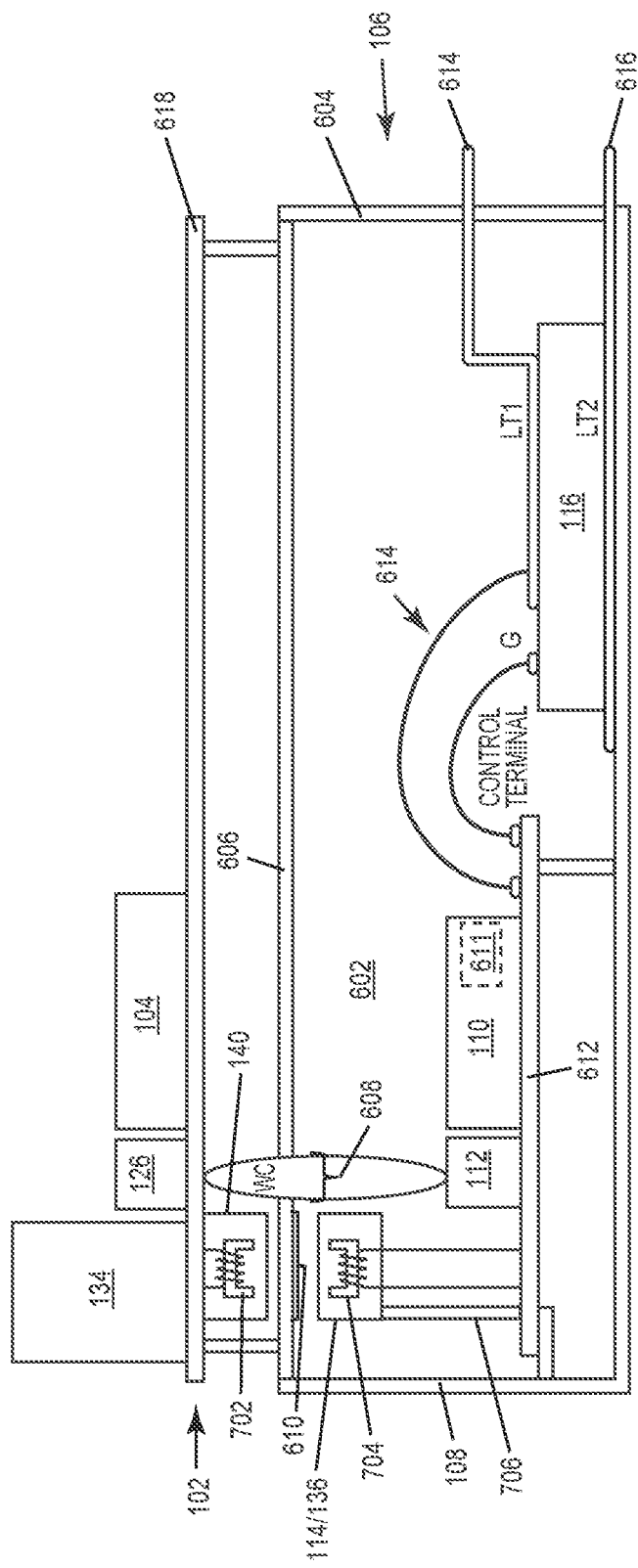

FIG. 7 illustrates a sectional view of another embodiment a power electronic assembly 700 that includes the power semiconductor module 108. The embodiment illustrated in FIG. 7 is similar to the one illustrated in FIG. 6. Different, however, a magnetic core is used for wireless coupling of energy. A first part 702 of the core is located on the primary side 102 of the power electronic assembly 700 and a second part 704 of the core is located on the secondary side 106. Use of a magnetic core 702, 704 significantly reduces the dedicated area 610 required for the wireless energy transfer and may also increase efficiency. The receiving core 704 may be mounted on the secondary-side substrate 612 via a mechanical fixation 706 of the receiving core 704. The following power electronic assembly embodiments are illustrated using a magnetic core for wireless energy coupling of energy. However, a core-less approach instead may be used for wireless energy coupling but with a larger dedicated area 610 for wireless energy coupling.

Figure 8:
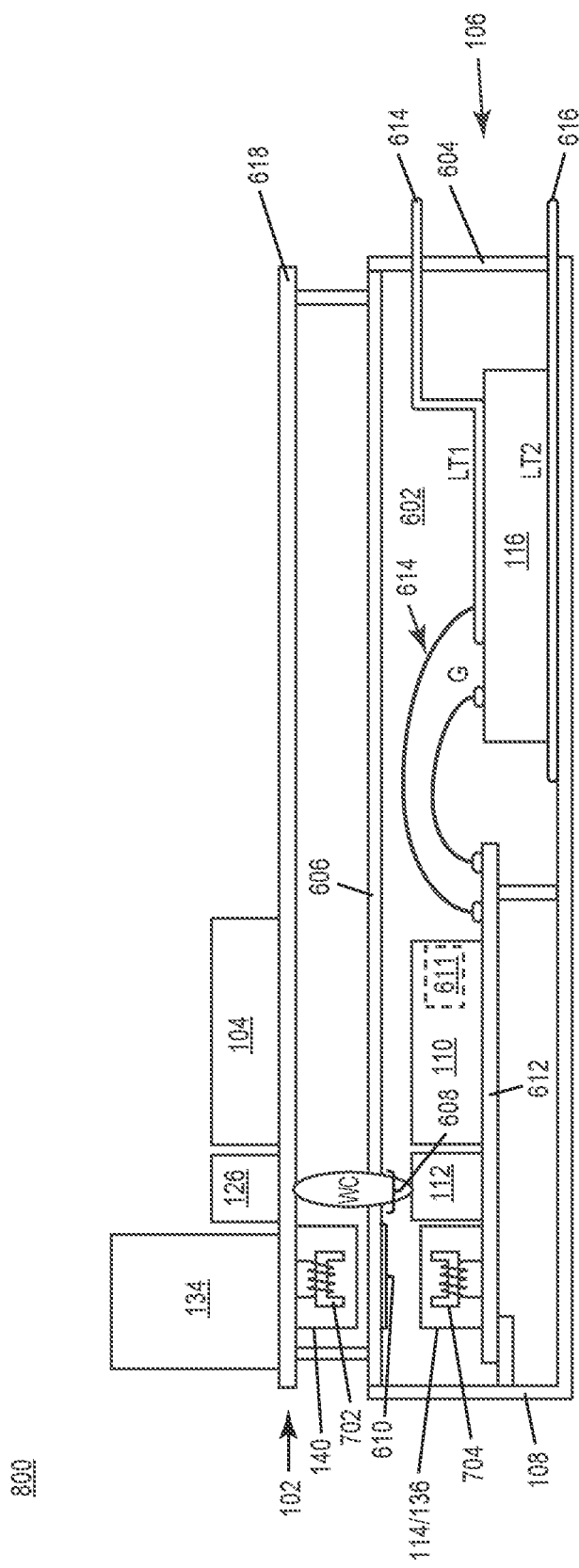

FIG. 8 illustrates a sectional view of another embodiment a power electronic assembly 800 that includes the power semiconductor module 108. The embodiment illustrated in FIG. 8 is similar to the one illustrated in FIG. 7. Different, however, the receiving core 704 is mounted directly on the secondary-side substrate 612, e.g., as a surface mount device. In an example for coreless power transfer, the coils for the wireless energy receiver may be part of the secondary side substrate, e.g., wiring on a PCB. As with the embodiments illustrated in FIGS. 6 and 7, the secondary-side power module housing that includes the power switch 116 provides full isolation between the primary and secondary sides 102, 106 of the power electronic assembly 800 in FIG. 8. Hence, the secondary-side power module housing is designed to satisfy clearance and creepage distance requirements where creepage refers to the shortest path between two conductors along an insulating surface and clearance refers to the shortest path between two conductors measured through air.

Figure 9:
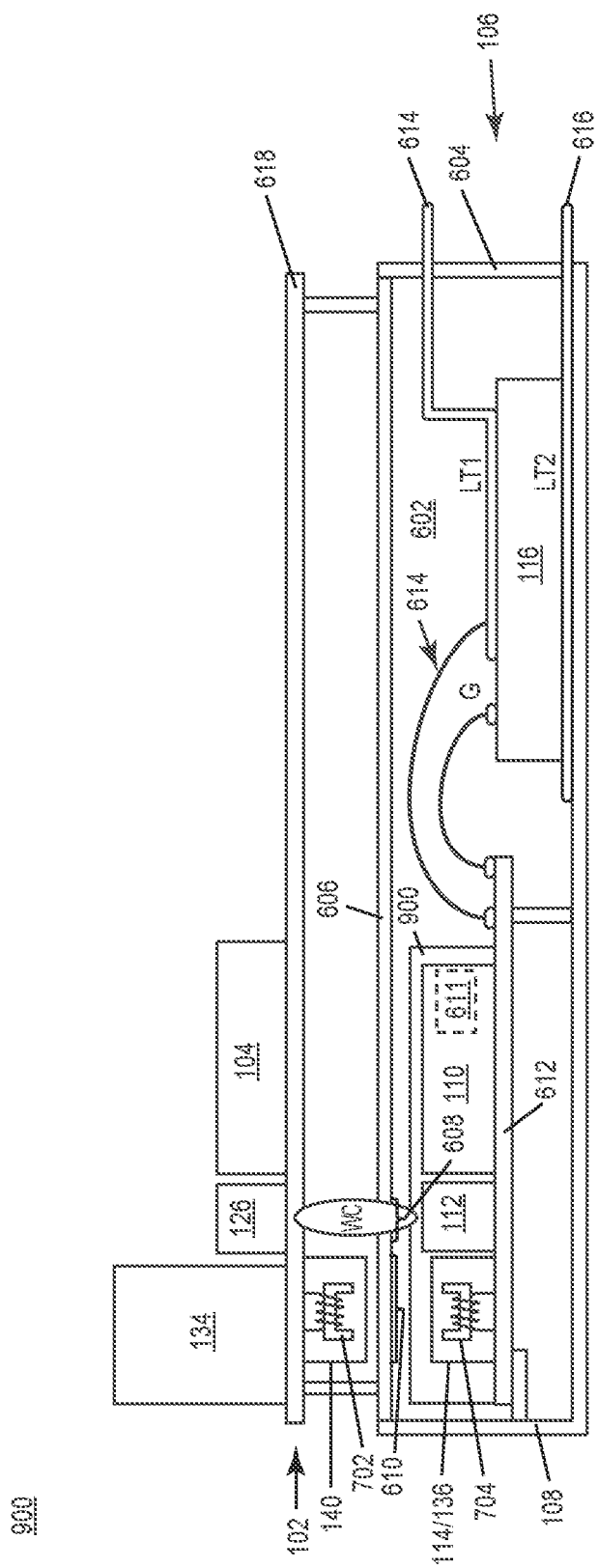

FIG. 9 illustrates a sectional view of another embodiment a power electronic assembly 900 that includes the power semiconductor module 108. The embodiment illustrated in FIG. 9 is similar to the one illustrated in FIG. 8. Different, however, the driver circuit 110, wireless communication circuit 112 and wireless energy receiver 114 of the secondary-side power semiconductor module 108 are each embedded in a mold compound 900 for isolation, e.g., as a molded sub-module. The wireless communication circuit 112 is aligned with the first dedicated area 608 of the housing or molded sub-module and the wireless energy receiver 114 is aligned with the second dedicated area 610 of the housing or molded sub-module to ensure wireless signal and energy coupling, respectively, between the primary and second sides 102, 106 of the power electronic assembly 900, as previously described herein. The isolation requirements can be covered by just the mold compound 900 or by a combination of the mold compound 900 and the power module housing.

Figure 10:
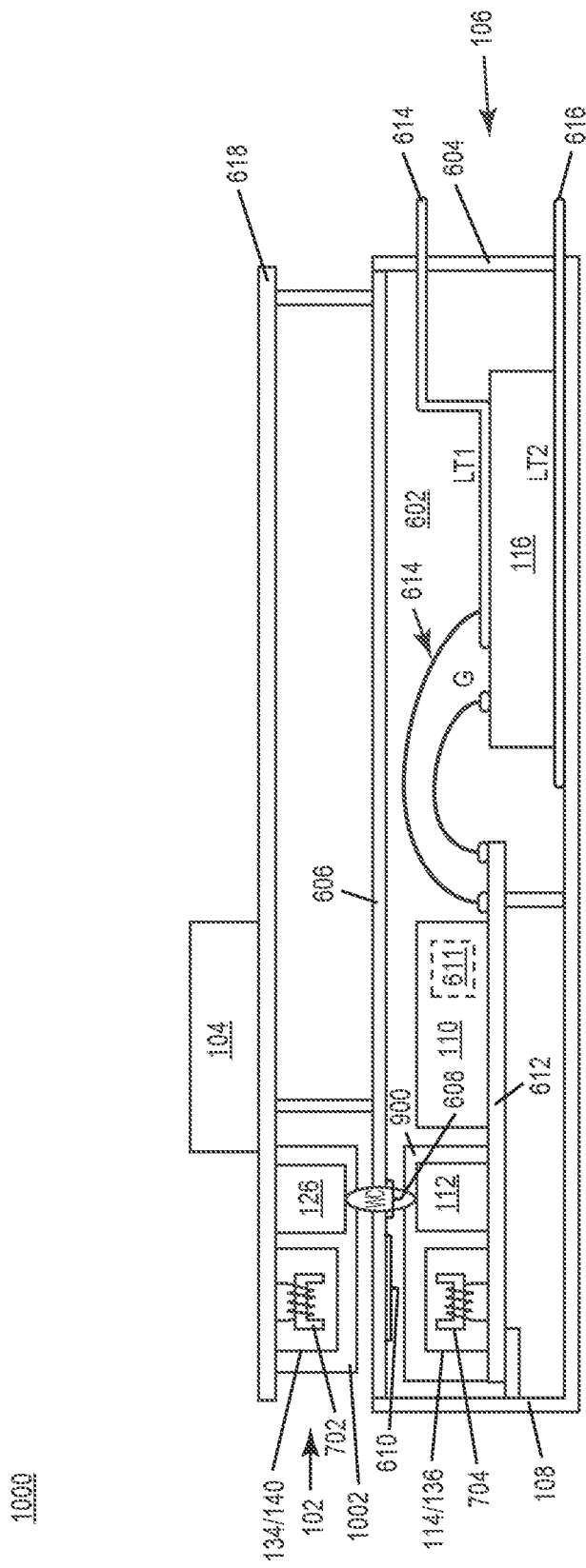

FIG. 10 illustrates a sectional view of another embodiment a power electronic assembly 1000 that includes the power semiconductor module 108. The embodiment illustrated in FIG. 10 is similar to the one illustrated in FIG. 9. Different, however, the driver circuit 110 of the secondary-side power semiconductor module 108 is not embedded in the sub-module covered by mold compound 900 in which the wireless communication circuit 112 and wireless energy receiver 114 are embedded. Also, the wireless communication circuit 126 and wireless energy transmitter 134 on the primary side 102 of the power electronic assembly 1000 are embedded in an additional sub-module covered with mold compound 1002 for isolation. The molded primary-side wireless communication circuit 126 and wireless energy transmitter 134 may be independently produced from the power switch 116 as an isolated power switch control unit. Using molded modules for a first part of a power switch control unit (e.g., primary-side transmitter) and a second part (secondary-side receiver and optionally driver) reduces the effort and cost associated with producing power electronic assemblies, mainly for the isolating components.

Figure 11:
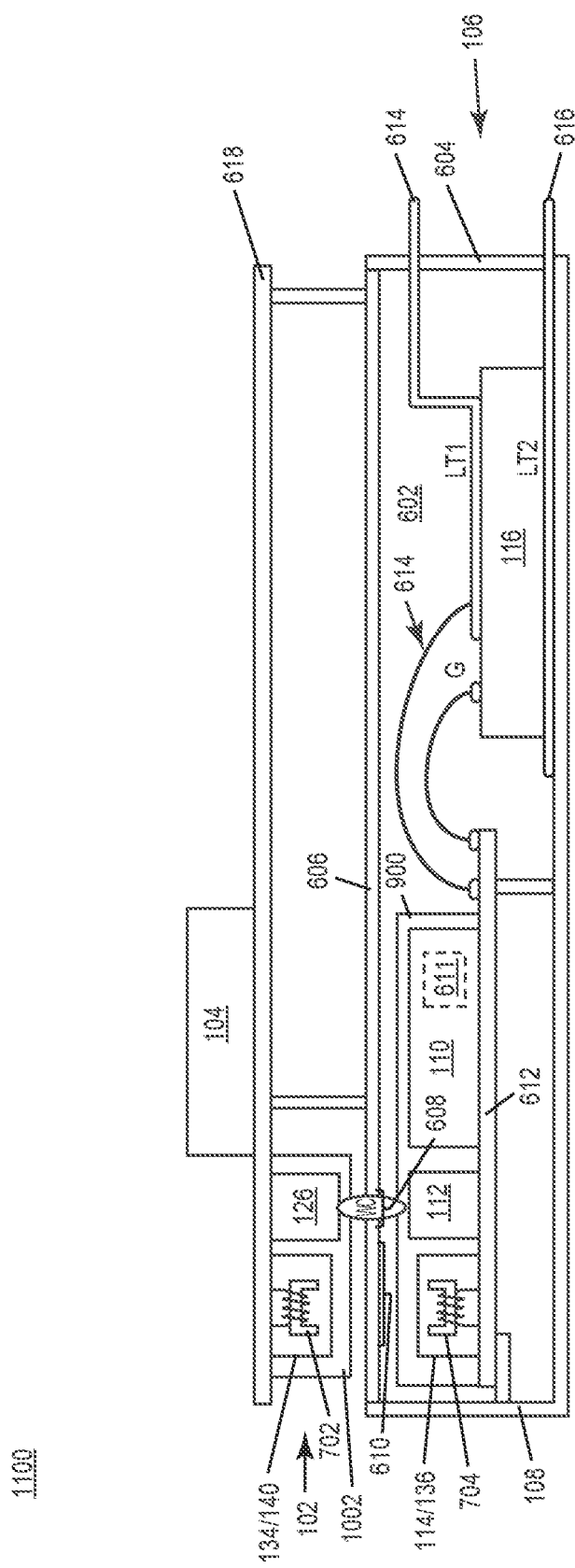

FIG. 11 illustrates a sectional view of another embodiment a power electronic assembly 1100 that includes the power semiconductor module 108. The embodiment illustrated in FIG. 11 is similar to the one illustrated in FIG. 10. Different, however, the driver circuit 110 of the secondary-side power semiconductor module 108 is also embedded in the same sub-module embedded in mold compound 900 as the wireless communication circuit 112 and wireless energy receiver 114 for additional isolation.

Figure 12:
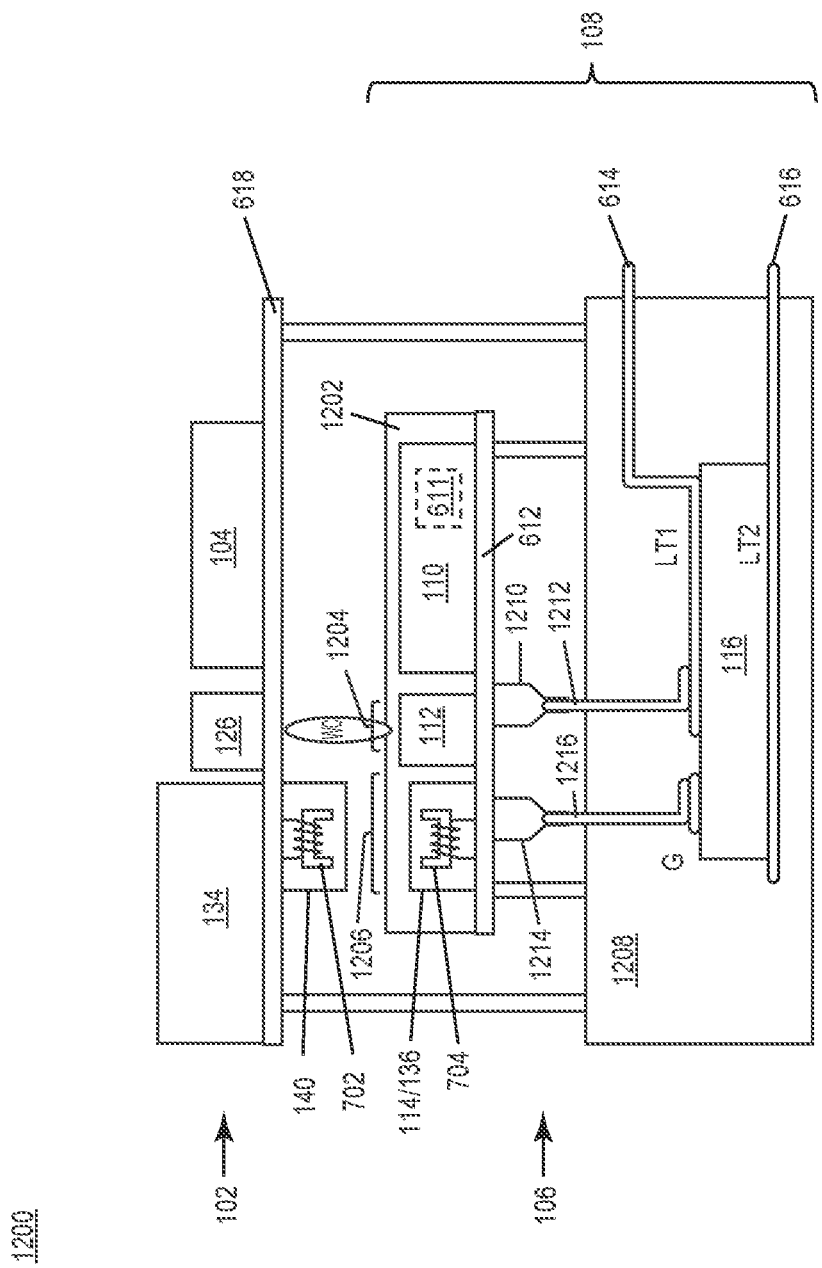

FIG. 12 illustrates a sectional view of another embodiment a power electronic assembly 1200 that includes the power semiconductor module 108. According to this embodiment, the power switch 116 is not included in the same housing as an insulated secondary side sub-module comprising the secondary-side driver circuit 110, wireless communication circuit 112 and wireless energy receiver 114. The insulated sub-module may be located in an insulated housing or may be embedded in mold compound 1202, and the wireless communication circuit 112 and wireless energy receiver 114 may be each embedded in the mold compound 1202, thus achieving the creepage and clearance distances for the separation of the primary side components and the secondary side components. The insulated housing or mold compound includes a first dedicated area 1204 through which the wireless control information is transferred to the wireless communication circuit 112 and a second dedicated area 1206 through which the wireless energy is transferred to the wireless energy receiver 114. The power switch 116 is included in a separate package 1208 which may be a molded package, for example.

The driver circuit also may be embedded in an insulated housing or the mold compound 1202 with the wireless communication circuit 112 and the wireless energy receiver 114. According to this embodiment, a first pin 1210 electrically connected to the driver circuit 110 protrudes through the insulated housing or the mold compound 1202 and is configured for electrical connection to a load terminal LT1 of the power switch 102 via one or more conductors 1212 such as wire bonds, wire ribbons, a metal clip, etc. A second pin 1214 electrically connected to the driver circuit 110 protrudes through the insulated housing or mold compound 1202 and is configured for electrical connection to the control terminal G of the power switch 116 via one or more conductors 1216 such as wire bonds, wire ribbons, a metal clip, etc.

The primary-side components 104, 126, 134, 140 may be built as single components as shown in FIG. 12. Alternatively, some or all of the primary-side components 104, 126, 134, 140 may be embedded in the same package or housing, e.g., as shown in FIGS. 10 and 11. In FIG. 12, the secondary-side driver circuit 110, wireless communication circuit 112 and wireless energy receiver 114 are each included in the same molded module. The power switch 116 is electrically connected to the secondary-side molded module. Accordingly, press-fit fit contacts may be used. The secondary-side moulded module embodiment of FIG. 12 significantly simplifies the isolation between the primary-side components 104, 126, 134, 140 and the secondary-side driver circuit 110, wireless communication circuit 112 and wireless energy receiver 114. With this approach, isolating components with respective creepage and clearance distances are not needed on the primary-side substrate 618 and the substrate 618 may be less expensive. Furthermore, the voltage domains of the secondary-side power topology may be ignored by the primary-side substrate 618 which is a significant advantage, especially for multi-level inverters where several independent voltage domains may be used.

The isolation between the primary side 102 and secondary side 106 may be achieved by the package/module construction, as previously described herein. Creepage and clearance distances may be achieved by the shape of an insulating housing or mold compound comprising circuits or discrete components for driver circuits or wireless communication or wireless energy transfer. Isolation barriers for this task are not necessarily required at the primary-side components 104, 126, 134 or secondary-side components 110, 112, 114. The package/module for a power switch or power switch topology contains an area for wireless transfer of data and an area for wireless transfer of energy. These areas may be overlapping or non-overlapping. A package for a single electronically controllable power switch requires only the load terminals as electrically conducting connections in addition to the isolated areas for wireless data and energy transfer.

Isolation between several power switches in a package or module can be achieved by separate areas for the wireless transfers. Depending on the internal structures in the package, these areas may be overlapping or non-overlapping. The primary-side PCB may be placed above or next to the package or module containing the power device(s). If placed above, the components inside the package may be placed where they fit best, because the locations of the areas for wireless operation may be freely chosen. The areas need not be oriented in the same direction, e.g., energy transfer may take place through the top part of the package/module, whereas data transfer may take place through a side part (or vice-versa). If wireless energy transfer requires a larger area than data transfer, the areas may be distributed over the package/module according to the available dimensions. The wireless operation may lead to completely molded packages or modules with a minimum of electrically conducting connections. The shape of the packages or modules may be optimized for mounting the components needed for wireless operation, e.g., a small hole in the package for receiving part of a magnetic core from the outside through a coil located inside the package. Sensing elements, e.g., for temperature, current, etc. may also be placed inside the package/module for wireless operation. The sensing elements may share the areas for the switch control or may be provided their own dedicated areas for wireless communication.

Consistent safety considerations may be addressed. Wiring, mechanical contacts, soldering points, etc. are particularly critical in this regard, because they might have a high FIT (failure-in-time) rate. If some components are locally handled, e.g., isolated with good creepage and clearance distances, the argumentation for robustness against short circuits between low-voltage (LV) and high-voltage (HV) components becomes much easier. If less connectors are used, the overall FIT rate decreases. On the other hand, the circuits for wireless transfer of data should be considered in the safety analysis. The simpler the HV part, the easier the safety analysis.

Although the present disclosure is not so limited, the following numbered examples demonstrate one or more aspects of the disclosure.

Example 1. A module, comprising: an electrically insulative housing; a driver circuit enclosed in the housing and configured to drive a control terminal of a power switch; a wireless communication circuit enclosed in the housing and configured to receive, through the housing, wireless control information transmitted to the module; and a wireless energy receiver enclosed in the housing and configured to receive, through the housing, energy wirelessly transmitted to the module, and to supply power to the driver circuit, wherein the driver circuit is configured to drive the control terminal of the power switch based on the wireless control information received by the wireless communication circuit.

Example 2. The module of example 1, wherein the housing comprises a mold compound, wherein the wireless communication circuit and the wireless energy receiver are embedded in the mold compound, and wherein the mold compound includes: a first dedicated area through which the wireless control information is transferred to the wireless communication circuit; and a second dedicated area through which the wireless energy is transferred to the wireless energy receiver.

Example 3. The module of example 2, wherein the driver circuit is embedded in the mold compound with the wireless communication circuit and the wireless energy receiver.

Example 4. The module of example 3, further comprising: a first pin electrically connected to the driver circuit and protruding through the mold compound, the first pin configured for electrical connection to a load terminal of the power switch; and a second pin electrically connected to the driver circuit and protruding through the mold compound, the second pin configured for electrical connection to the control terminal of the power switch.

Example 5. The module of any of examples 1 through 4, wherein the housing delimits an interior space of the module and comprises a plurality of electrically insulative sidewalls and an electrically insulative cover, wherein the driver circuit, the wireless communication circuit and the wireless energy receiver are disposed in the interior space, and wherein the housing includes: a first dedicated area through which the wireless control information is transferred to the wireless communication circuit; and a second dedicated area through which the wireless energy is transferred to the wireless energy receiver.

Example 6. The module of example 5, wherein the power switch is included in the module and disposed in the interior space, and wherein the driver circuit is electrically connected to the control terminal and to a first load terminal of the power switch within the housing.

Example 7. The module of example 6, further comprising: a first pin electrically connected to the first load terminal of the power switch and protruding through one of the electrically insulative sidewalls or the electrically insulative cover of the housing; and a second pin electrically connected to a second load terminal of the power switch and protruding through one of the electrically insulative sidewalls or the electrically insulative cover of the housing.

Example 8. The module of example 6 or 7, wherein the power switch is enclosed in the housing, wherein the driver circuit is attached to a substrate enclosed in the housing, wherein the power switch and the driver circuit are electrically connected to one another by electrical conductors enclosed in the housing.

Example 9. The module of any of examples 5 through 8, wherein the wireless communication circuit and the wireless energy receiver are embedded in a mold compound, wherein the wireless communication circuit is aligned with the first dedicated area of the housing, and wherein the wireless energy receiver is aligned with the second dedicated area of the housing.

Example 10. The module of example 9, wherein the driver circuit is embedded in the mold compound with the wireless communication circuit and the wireless energy receiver.

Example 11. The module of any of examples 5 through 10, wherein the first dedicated area and the second dedicated area of the housing partly overlap with one another.

Example 12. The module of any of examples 1 through 11, wherein the wireless communication circuit is configured to transmit, through the housing, status information associated with operation of the power switch.

Example 13. The module of any of examples 1 through 12, wherein the wireless communication circuit comprises a mm (millimeter) wave antenna configured to receive the wireless control information as mm wave signals.

Example 14. The module of any of examples 1 through 13, wherein the wireless energy receiver comprises: a coil configured to receive, through the housing, the energy wirelessly transmitted to the module; a capacitor configured to buffer the energy received by the coil; and an energy conditioning circuit configured to supply power to the driver circuit from the energy received by the coil.

Example 15. The module of example 14, wherein the coil is formed from a foil that is attached to a carrier.

Example 16. The module of any of examples 1 through 15, wherein the housing includes a first dedicated area through which the wireless control information is transferred to the wireless communication circuit, and a second dedicated area through which the wireless energy is transferred to the wireless energy receiver.

Example 17. The module of example 16, wherein the first dedicated area and the second dedicated area of the housing partly overlap one another.

Example 18. The module of any of examples 1 through 17, further comprising: a sensor enclosed in the housing and configured to sense a parameter of the power switch, wherein the wireless communication circuit is configured to convert an electrical signal generated by the sensor to a wireless signal and transmit the wireless signal through the housing.

Example 19. A power electronic assembly, comprising: a power switch; a primary-side control unit configured to control operation of the power switch; and a secondary-side module wirelessly coupled to the primary-side control unit and comprising: an electrically insulative housing; a driver circuit enclosed in the housing and configured to drive a control terminal of the power switch; a wireless communication circuit enclosed in the housing and configured to receive, through the housing, wireless control information transmitted from the primary-side control unit to the secondary-side module and associated with operation of the power switch; and a wireless energy receiver enclosed in the housing and configured to receive, through the housing, energy wirelessly transmitted from the primary-side control unit to the secondary-side module, and to supply power to the power switch and the driver circuit, wherein the driver circuit of the secondary-side module is configured to drive the control terminal of the power switch based on the wireless control information received by the wireless communication circuit.

Example 20. The power electronic assembly of example 19, wherein the housing of the secondary-side module includes a first dedicated area through which the wireless control information is transferred to the wireless communication circuit, and a second dedicated area through which the wireless energy is transferred to the wireless energy receiver.

Example 21. The power electronic assembly of example 19 or 20, further comprising an insulative material and/or an air gap between the module and the primary-side control unit.

Example 22. A power conversion control circuit, comprising: a wireless communication circuit configured to wirelessly transmit control information to an insulated module that includes a driver circuit for a power switch, wherein the control information is configured to control operation of the power switch via the driver circuit; and a wireless energy transmitter configured to wirelessly transmit energy to the insulated module, for supplying power to the driver circuit.

Example 23. The power conversion control circuit of example 22, wherein the wireless communication circuit is configured to receive information from the insulated module and associated with the operation of the power switch.

Example 24. The power conversion control circuit of example 22 or 23, further comprising: an electrically insulative housing, wherein the wireless communication circuit and the wireless energy transmitter are disposed in the electrically insulative housing, wherein the housing includes: a first dedicated area through which the control information is wirelessly transmitted to the insulated module; and a second dedicated area through which the energy is wirelessly transmitted to the insulated module.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A module, comprising:
an electrically insulative housing;
a driver circuit enclosed in the housing and configured to drive a control terminal of a power switch;
a wireless communication circuit enclosed in the housing and configured to receive, through the housing, wireless control information transmitted to the module; and
a wireless energy receiver enclosed in the housing and configured to receive, through the housing, energy wirelessly transmitted to the module, and to supply power to the driver circuit,
wherein the driver circuit is configured to drive the control terminal of the power switch based on the wireless control information received by the wireless communication circuit.

2. The module of claim 1, wherein the housing comprises a mold compound, wherein the wireless communication circuit and the wireless energy receiver are embedded in the mold compound, and wherein the mold compound includes:
a first dedicated area through which the wireless control information is transferred to the wireless communication circuit; and
a second dedicated area through which the wireless energy is transferred to the wireless energy receiver.

3. The module of claim 2, wherein the driver circuit is embedded in the mold compound with the wireless communication circuit and the wireless energy receiver.

4. The module of claim 3, further comprising:
a first pin electrically connected to the driver circuit and protruding through the mold compound, the first pin configured for electrical connection to a load terminal of the power switch; and
a second pin electrically connected to the driver circuit and protruding through the mold compound, the second pin configured for electrical connection to the control terminal of the power switch.

5. The module of claim 1, wherein the housing delimits an interior space of the module and comprises a plurality of electrically insulative sidewalls and an electrically insulative cover, wherein the driver circuit, the wireless communication circuit and the wireless energy receiver are disposed in the interior space, and wherein the housing includes:
a first dedicated area through which the wireless control information is transferred to the wireless communication circuit; and
a second dedicated area through which the wireless energy is transferred to the wireless energy receiver.

6. The module of claim 5, wherein the power switch is included in the module and disposed in the interior space, and wherein the driver circuit is electrically connected to the control terminal and to a first load terminal of the power switch within the housing.

7. The module of claim 6, further comprising:
a first pin electrically connected to the first load terminal of the power switch and protruding through one of the electrically insulative sidewalls or the electrically insulative cover of the housing; and
a second pin electrically connected to a second load terminal of the power switch and protruding through one of the electrically insulative sidewalls or the electrically insulative cover of the housing.

8. The module of claim 6, wherein the power switch is enclosed in the housing, wherein the driver circuit is attached to a substrate enclosed in the housing, wherein the power switch and the driver circuit are electrically connected to one another by electrical conductors enclosed in the housing.

9. The module of claim 5, wherein the wireless communication circuit and the wireless energy receiver are embedded in a mold compound, wherein the wireless communication circuit is aligned with the first dedicated area of the housing, and wherein the wireless energy receiver is aligned with the second dedicated area of the housing.

10. The module of claim 9, wherein the driver circuit is embedded in the mold compound with the wireless communication circuit and the wireless energy receiver.

11. The module of claim 5, wherein the first dedicated area and the second dedicated area of the housing partly overlap with one another.

12. The module of claim 1, wherein the wireless communication circuit is configured to transmit, through the housing, status information associated with operation of the power switch.

13. The module of claim 1, wherein the wireless communication circuit comprises a mm (millimeter) wave antenna configured to receive the wireless control information as mm wave signals.

14. The module of claim 1, wherein the wireless energy receiver comprises:
a coil configured to receive, through the housing, the energy wirelessly transmitted to the module;
a capacitor configured to buffer the energy received by the coil; and
an energy conditioning circuit configured to supply power to the driver circuit from the energy received by the coil.

15. The module of claim 14, wherein the coil is formed from a foil that is attached to a carrier.

16. The module of claim 1, wherein the housing includes a first dedicated area through which the wireless control information is transferred to the wireless communication circuit, and a second dedicated area through which the wireless energy is transferred to the wireless energy receiver.

17. The module of claim 16, wherein the first dedicated area and the second dedicated area of the housing partly overlap one another.

18. The module of claim 1, further comprising:
a sensor enclosed in the housing and configured to sense a parameter of the power switch,
wherein the wireless communication circuit is configured to convert an electrical signal generated by the sensor to a wireless signal and transmit the wireless signal through the housing.

19. A power electronic assembly, comprising:
a power switch;
a primary-side control unit configured to control operation of the power switch; and
a secondary-side module wirelessly coupled to the primary-side control unit and comprising:
an electrically insulative housing;
a driver circuit enclosed in the housing and configured to drive a control terminal of the power switch;
a wireless communication circuit enclosed in the housing and configured to receive, through the housing, wireless control information transmitted from the primary-side control unit to the secondary-side module and associated with operation of the power switch; and
a wireless energy receiver enclosed in the housing and configured to receive, through the housing, energy wirelessly transmitted from the primary-side control unit to the secondary-side module, and to supply power to the power switch and the driver circuit,
wherein the driver circuit of the secondary-side module is configured to drive the control terminal of the power switch based on the wireless control information received by the wireless communication circuit.

20. The power electronic assembly of claim 19, wherein the housing of the secondary-side module includes a first dedicated area through which the wireless control information is transferred to the wireless communication circuit, and a second dedicated area through which the wireless energy is transferred to the wireless energy receiver.

21. The power electronic assembly of claim 19, further comprising an insulative material and/or an air gap between the secondary-side module and the primary-side control unit.

22. A power conversion control circuit, comprising:
a wireless communication circuit configured to wirelessly transmit control information to an insulated module that includes a driver circuit for a power switch, wherein the control information is configured to control operation of the power switch via the driver circuit;
a wireless energy transmitter configured to wirelessly transmit energy to the insulated module, for supplying power to the driver circuit; and
an electrically insulative housing,
wherein the wireless communication circuit and the wireless energy transmitter are disposed in the electrically insulative housing,
wherein the housing includes:
a first dedicated area through which the control information is wirelessly transmitted to the insulated module; and
a second dedicated area through which the energy is wirelessly transmitted to the insulated module.

23. The power conversion control circuit of claim 22, wherein the wireless communication circuit is configured to receive information from the insulated module and associated with the operation of the power switch.

* * * * *